(12) United States Patent
Raveh et al.

(10) Patent No.: US 10,168,884 B2
(45) Date of Patent: Jan. 1, 2019

(54) GENERATING USER INTERFACE CONFIGURATION PAGES TO CONFIGURE A COMPUTING RESOURCE COMPRISED OF COMPONENT COMPUTING RESOURCES

(71) Applicant: International Business Machines Corporation, Armonk, NY (US)

(72) Inventors: Yoni Raveh, Modin (IL); Gal Sinay, Tal Aviv (IL); Moshe Weiss, Petah Tikvah (IL); Malki Wiegner, Kiryat Ata (IL)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 14/937,535

(22) Filed: Nov. 10, 2015

(65) Prior Publication Data
US 2017/0131883 A1    May 11, 2017

(51) Int. Cl.
*G06F 3/0484* (2013.01)
*G06F 3/0482* (2013.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC .. G06F 3/04847; G06F 3/0482; G06F 3/0484; G06F 3/04842; G06F 3/0605; G06F 3/0629
See application file for complete search history.

(56) References Cited

U.S. PATENT DOCUMENTS 5,737,559 A *  4/1998  Orton ................ G06F 8/24
                                               715/807
7,496,594 B1 *  2/2009  Cummings ......... G06F 9/451
(Continued)

OTHER PUBLICATIONS

IBM, "IBM System Storage DS Storage Manager Version 10 Installation and Host Support Guide," Twelfth Edition, Jun. 2012, ftp://ftp.softwareibm.com/systems/support/system_x_pdf/00w0188.pdf.*

(Continued)

*Primary Examiner* — Ryan Barrett
(74) *Attorney, Agent, or Firm* — David W. Victor; Konrad, Raynes, Davda and Victor LLP

(57) ABSTRACT

Provided are a computer program product, system, and method for generating user interface (GUI) configuration pages to configure a computing resource comprised of component computing resources. A configuration page is generated for rendering in a GUI having user selectable graphical representations of a hierarchy of component computing resources from which a subject computing resource is configured. Each of the component computing resources graphically represented as within a higher level component computing resource in the hierarchy is configured with capacity from the higher level component computing resource. User selection is received of one of the graphical representations of a selected one of the component computing resources in the graphical representations of the hierarchy. User selectable component computing resource instances are generated in the configuration page for the selected component computing resource in which the user selects the component computing resource instance from which the subject computing resource is configured.

25 Claims, 11 Drawing Sheets

(51) Int. Cl.
*G06F 3/06* (2006.01)
*G06F 8/38* (2018.01)
*G06F 9/451* (2018.01)
*G06F 9/445* (2018.01)

(52) U.S. Cl.
CPC ............ *G06F 3/0605* (2013.01); *G06F 3/067* (2013.01); *G06F 3/0629* (2013.01); *G06F 8/38* (2013.01); *G06F 9/451* (2018.02); *G06F 9/44505* (2013.01)

(56) References Cited

U.S. PATENT DOCUMENTS

| | | | |
|---|---|---|---|
| 7,725,473 B2 | 5/2010 | Lamb et al. | |
| 8,838,654 B1 | 9/2014 | Hannah et al. | |
| 2003/0080974 A1* | 5/2003 | Grosvenor | G06K 9/00228 345/622 |
| 2004/0150644 A1* | 8/2004 | Kincaid | G06F 3/0481 345/440 |
| 2006/0106999 A1* | 5/2006 | Baldwin | G06F 3/0605 711/153 |
| 2007/0214268 A1* | 9/2007 | Laurent | G06F 3/0607 709/226 |
| 2011/0238715 A1* | 9/2011 | Quinn | G06F 17/30238 707/822 |
| 2011/0289459 A1* | 11/2011 | Athans | G06F 3/0481 715/854 |
| 2012/0150912 A1* | 6/2012 | Ripberger | G06F 21/80 707/786 |
| 2013/0046906 A1* | 2/2013 | Ripberger | G06F 3/0629 710/12 |
| 2014/0007093 A1* | 1/2014 | Deshpande | G06F 9/45533 718/1 |
| 2014/0059196 A1 | 2/2014 | Onffroy et al. | |
| 2014/0196030 A1* | 7/2014 | Deshpande | G06F 9/45558 718/1 |
| 2014/0203999 A1* | 7/2014 | Shim | G06F 3/1454 345/2.2 |
| 2014/0207731 A1 | 7/2014 | Mack | |
| 2014/0229879 A1* | 8/2014 | Lee | G06F 3/04815 715/771 |
| 2015/0074612 A1* | 3/2015 | Antipa | G06F 3/0482 715/854 |
| 2016/0232260 A1* | 8/2016 | Kanatani | G06F 17/50 |
| 2017/0131853 A1* | 5/2017 | Keller | G06F 3/14 |
| 2018/0039433 A1* | 2/2018 | Klein | G06F 3/0619 |

OTHER PUBLICATIONS

Johnson et al., "Tree-Maps: A Space-Filling Approach to the Visualization of Hierarchical Information Structures," Proceedings of the 2nd conference on Visualization '91, pp. 284-291, Oct. 22-25, 1991, https://www.cs.umd.edu/~ben/papers/Johnson1991Tree.pdf.*
Dufrasne et al., "IBM XIV Storage System Architecture and Implementation," Ninth Edition, May 2014, https://www.redbooks.ibm.com/redbooks/pdfs/sg247659.pdf.*
Schiffner et al.,"Multiple Views and Abstractions With an Extended Entity-Relationship Model", dated Dec. 31, 1979, An IP.com Prior Art Database Technical Disclosure, IP.com No. 000128154, Total 13 pages.
"An Entity-Based Database Interface", dated Dec. 31, 1979, An IP.com Prior Art Database Technical Disclosure, IP.com No. 000128889, total 13 pages.
"Real-time Components Monitor(An OCTOPUS)", dated Aug. 14, 2006, An IP.com Prior Art Database Technical Disclosure, IP.com No. 000138992, Total 5 pages.
"A New Type of BOM Model and Its Application", by Y. Wang et al., Proceedings of the 2nd International Conference on Computer Science and Electronics Engineering (ICCSEE 2013), dated Mar. 2010, Total 4 pages.

* cited by examiner

Computing Resource Type Information

Computing Resource Instance

Use Relationship Types

Use Relationship Instance

GENERATING USER INTERFACE CONFIGURATION PAGES TO CONFIGURE A COMPUTING RESOURCE COMPRISED OF COMPONENT COMPUTING RESOURCES

BACKGROUND OF THE INVENTION

1. Field of the Invention

The present invention relates to a computer program product, system, and method for generating user interface configuration pages to configure a computing resource comprised of component computing resources.

2. Description of the Related Art

There are two types of configuration programs to guide a user through a chain of configuration settings to configure a computing resource, dialogs and guided actions, such as a configuration wizard. The dialog technique operates by providing dialog pages, where each page is relevant to one step of the chain of configuration settings and is autonomous in that one page is not dependent on the other. The user must succeed in the configuration in one dialog page, and only when configurations in one page successfully complete will the dialog open a different dialog and continue to the next dialog page and configuration operations. However, with the dialog technique, if one dialog page is blocked due to a dependency of a setting entered through an earlier dialog page, the user may need to close the dialog, open another, and then fix the problem by going back to the previous dialog page in which the conflicting setting was introduce. However, with the dialog pages, the user is not aware of where in the dialog pages the problem occurred to allow the user to proceed to the correct dialog page to enter the correct setting.

The other type of configuration technique involves guided action, also referred to as a wizard, to guide the user through a set of actions where at the end all the actions are committed if there are no dependency conflicts in entered settings. The issue with guided action technique is that the guided action program does not provide the user with sufficient information to know all dependencies and prerequisites while performing the configuration in a particular panel and before proceeding to the next panel. Thus, the error may not be introduced until after several panels into the wizard, which makes it difficult for the user to determine the cause of the error in order to take actions to fix the problem.

There is a need in the art for improved techniques for providing a user interface to configure a computational resource.

SUMMARY

Provided are a computer program product, system, and method for generating user interface (GUI) configuration pages to configure a computing resource comprised of component computing resources 20. A configuration page is generated for rendering in a GUI having user selectable graphical representations of a hierarchy of component computing resources from which a subject computing resource is configured. Each of the component computing resources graphically represented as within a higher level component computing resource in the hierarchy is configured with capacity from the higher level component computing resource. User selection is received of one of the graphical representations of a selected one of the component computing resources in the graphical representations of the hierarchy. User selectable component computing resource instances are generated in the configuration page for the selected component computing resource in which the user selects the component computing resource instance from which the subject computing resource is configured.

By providing in the configuration page a hierarchy of component resources of a subject computing resource to configure, the user may determine which of the component computing resources based on a hierarchy of the components which determines how components within a higher level component in the hierarchy are configured with capacity from the higher level component. This allows the user to select to configure higher level components first before the lower level components which are configured from the higher level components.

In further embodiments, a separate graphical representation is generated for each component computing resource in the graphical representation of the hierarchy, wherein the graphical representation for each of the component computing resources is generated with a first design if the component computing resource represented by the graphical representation has not been configured and generated with a second design if the component computing represented by the graphical representation has been configured.

By rendering components that have been configured and not configured with different designs, the user may determine which components in the hierarchy need to be configured and may then focus on configuring those components indicated as not yet configured in the graphically represented hierarchy of component computing resources that need to be configured in order to configure the subject computing resource.

In further embodiments, the generating the graphical representations of the hierarchy comprises generating concentric circles, wherein an innermost circle of the concentric circles represents the subject computing resource being configured and each of the other concentric circles containing the innermost concentric circle represents one of the component resources to configure, wherein one concentric circle containing contained concentric circles is at a higher level of the hierarchy than the component computing resources represented by the contained concentric circles.

Generating the representation of the hierarchy with concentric circles, such that a component represented by a concentric circle containing another concentric circle is at a higher level of the hierarchy. The use of concentric circles to represent the hierarchy of components allows the user to visually determine the hierarchical containing relationship and see which components are configured from resources from another of the components.

In yet further embodiments, user selection is received of one of the concentric circles other than the innermost concentric circle. Component computing resource instances are generated in the configuration page for the component computing resource represented by the selected concentric circle that are available to supply capacity to the subject computing resource being configured. User selection is received of one of the component computing resource instances. The user selected component computing resource instance to use to configure the subject computing resource is saved.

Generating in the configuration page component computing resource instance of the component represented by the selected concentric circle allows the user to visually realize all the available instances of the selected computing resource represented by the selected concentric circles so that the user may select one of the component instances for the component represented by the selected concentric circles.

In further embodiments, user selectable graphical representation of at least one use relationships of the subject computing resource is generated in the configuration page. The use relationship provides information on a relationship of the subject computing resource with a related computing resource. User interface controls are generated in the configuration page to enable configuration settings to be entered to configure the related computing resource for the for the use relationship.

In further embodiments, the configuration page renders simultaneously the graphical representations of the hierarchy of component computing resources and the graphical representations of the use relationships including the subject computing resource.

The configuration page provides simultaneous visual representations of components to configure for a computing resource and use relationships in which the subject computing resource may be included to allow the user to provide configuration settings for a user relationship in which the subject computing resource is included. In this way, the configuration page by providing graphical representations of both the components and use relationships of a subject computing resource to configure allow the user to determine the order in which settings are entered for the components and the use relationships.

Further provided are a computer program product, system, and method for generating a configuration page for rendering in a graphical user interface (GUI) for a user to use to configure a subject storage volume. A configuration page is generated for rendering in the GUI having user selectable graphical representations of a hierarchy of a system, a domain, and a storage pool from which the subject storage volume is configured. The domain is configured from the system, the storage pool is configured from the domain, and the subject storage volume is configured from instances selected through the configuration page for the system, the domain, and the storage pool. User selection is received of one of the graphical representations of a selected one of the system, domain, and the storage pool in the graphical representations of the hierarchy. User selectable instances for the selected system, domain, or storage pool from which the user selects the instance of the system, domain, or the storage pool, respectively, from which the subject storage volume is configured are generated in the configuration page.

By providing in the configuration page a hierarchy of a system, domain and storage pool to configure for a storage volume, the user may determine which of the system, domain and storage pool based on a hierarchy of the components which determines how components within a higher level component in the hierarchy are configured with capacity from the higher level component. This allows the user to select to configure higher level components first before the lower level components which are configured from the higher level components.

DETAILED DESCRIPTION

Described embodiments provide techniques for generating graphical representations of a hierarchical relationship of component computing resources of a subject computing resource to configure. Graphical representations of use relationships involving related computing resources, including the subject computing resources may also be generated to allow configuration of use relationships of the related computing resources. The described embodiments provided graphical information on the relationships of the subject configuration resource to present the user with a graphical view of the component computing resources that need to be configured to supply resources and settings to a subject computing resource. This allows the user to view all the possible component computing resources and use relationships to select what portion of the component computing resources and use relationships the user wants to configure. This approach avoids the need to have to follow a specific order defined by a configuration dialog or wizard of ordered panels to configure a computing resource.

Figure 1:
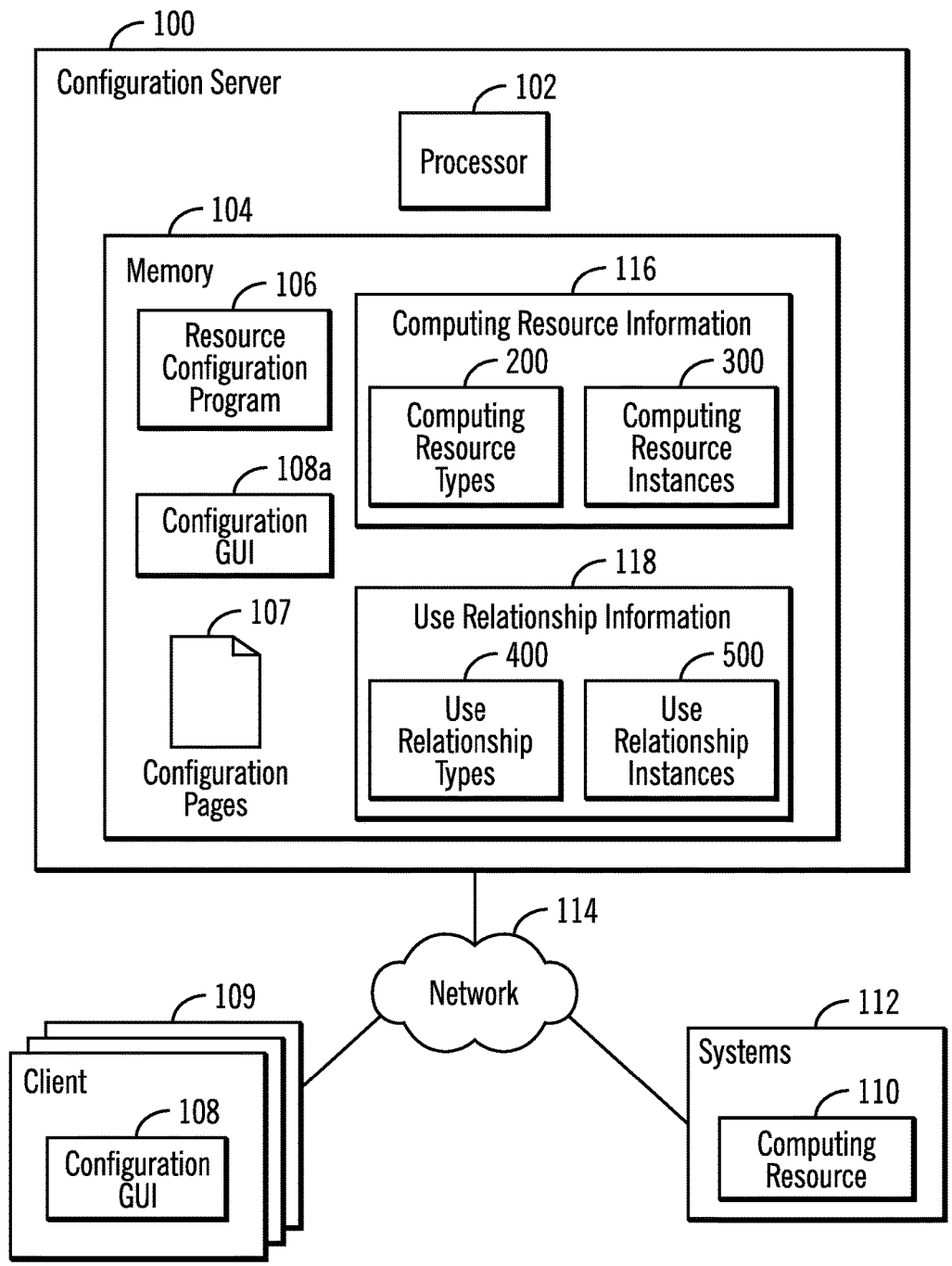
FIG. 1 illustrates an embodiment of a configuration environment.

FIG. 1 illustrates an embodiment of a configuration environment including a configuration server 100 having a processor 102 and a main memory 104 including a resource configuration program 106 for generating configuration pages 107 of user interface controls to render in a configuration graphical user interface (GUI) 108 running in client systems 109 and an instance 108a in the server 100 to configure the computing resources 110, 112 over a network 114. The configuration program 106 may also generate pages 107 to configure computing resources 110 in and connected to the clients 109 and the server 100. The configuration server 100 may transmit the configuration pages 107 to the client systems 109 over the network 114 to render in their configuration GUIs 108 to allow computing resources 110 to be configured from different clients.

The resource configuration program 106 may generate the configuration pages 107 to load in the configuration GUI 108, 108a from information maintained in computing resource information 116 and use relationship information 118. The computing resource information 116 includes computing resource types 200 providing metadata on different types and classes of computing resources used to create and configure computing resource instances 300 created for the different computing resource types 200. The use relationship information 118 includes use relationship types 400 providing metadata on different types and classes of use relationships used to create and configure use relationship instances 500 for the different use relationship types 400.

To render the configuration user interface in the configuration GUI 108, 108a the resource configuration program 106 may generate configuration pages 107 having user interface controls and content loaded into the configuration GUI 108, 108a. These pages 109 may be rendered using Hypertext Markup Language (HTML), Extended Markup Language (XML) and additional software frameworks, browser extensions, plugins, etc. that render graphics and other user interface components, such as ActiveX®, Adobe Flash®, JavaFX®, Java® Applets, JavaScript®, etc. (In many countries, ActiveX is a registered trademark of Microsoft Corporation; Adobe Flash is a registered trademark of Adobe Systems Inc.; and Java, JavaScript, and JavaFX are registered trademarks of Oracle America, Inc.) The configuration GUI 108, 108a may comprise a program suitable for rendering configuration pages 107 of user interface controls, such as a web browser or desktop application program. The configuration GUI 108, 108a and the generated configuration pages 107 may be rendered on a display screen at the system 100 and clients 109, and input received through a user input device, such as a mouse, keyboard, voice activation, touch sensitive screen, etc.

When generating the user interface controls in the page 109, a new page may be generated or graphic changes may be rendered through a plugin, browser extension or other graphics delivery mechanisms generated within the current page 109 loaded in the configuration GUI 108, 108a.

A computing resource may be comprised of component computing resources, where capacity is assigned from the component computing resource to the subject computing resource receiving the assigned or configured capacity. Further a component computing resource may itself be comprised of one or more component resources, so that at any level of a component resource, there may be any number of further component resources from which capacity is assigned to the component resource, and by extension to the initial subject computing resource having multiple levels of nested component resources. For instance, a storage volume may be comprised of components, such as a storage pool, that is itself a component of a domain, which is a further component of a system. The computing resource may comprise a resource used to manage how the data is stored, such as a consistency group, compression, encryption, replication, etc. The computing resource 110 may comprise other types of hardware devices and programs, such as backup programs, database programs, workflow programs, hardware elements, operating system resources, etc.

A computing resource and component computing resource may comprise any hardware device, virtual device, program or virtual program.

Examples of use relationships include a mirror use relationship to mirror data between a source and target volume, where the volumes comprise the related computing resources subject to the use relationship. Another use relationship is a mapping of related computing resources, such as a mapping of a storage volume to one or more host systems.

The memory device 104 may comprise suitable devices known in the art for functioning as a main memory of a computer system, such as a Random Access Memory (RAM), Dynamic RAM (DRAM), Static DRAM (SDRAM), storage-class memory (SCM), Phase Change Memory (PCM), resistive random access memory (RRAM), spin transfer torque memory (STM-RAM), conductive bridging RAM (CBRAM), etc.

The computing resources 110 to configure may be comprised of component resources for which configuration parameter values need to be provided in order to configure the computing resources 110. In one embodiment, the computer system 100 is connected to the computing resource 110 to configure over a network 114. Alternatively, the computer system 100 may be connected to computing resource 110 over direct connections, such as a serial cable, Universal Serial Bus (USB) or other type of direct connections.

Figure 2:
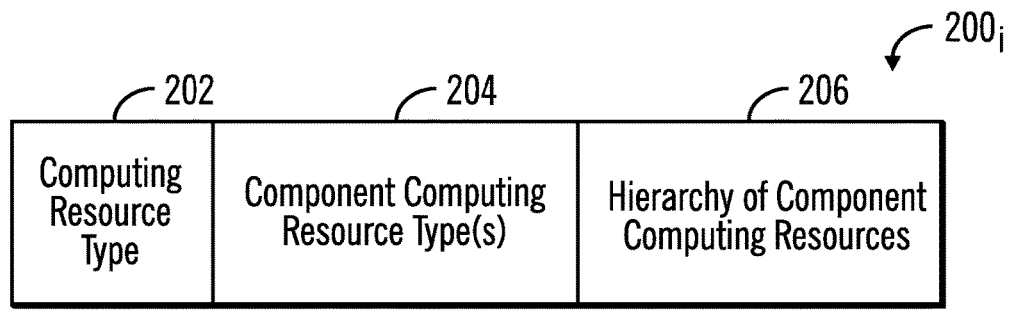
FIG. 2 illustrates an embodiment of computing resource type information.

FIG. 2 illustrates an embodiment of an instance of a computing resource type $200_i$ for a type of computing resource, e.g., type of hardware, software, etc., including a computing resource type name 202; the one or more component computer resource types 204 from which resources or capacity are assigned to the computing resource type 202; and a hierarchy of the component resources 206, indicating which component computing resources provide capacity for the computing resource type 202. The computing resource type 202 can be considered as belonging to the component computing resource type 204 because they receive resources, settings or capacity from the component computing resource type 204. The same applies for a component computing resource that belongs in another component computing resource.

Figure 3:
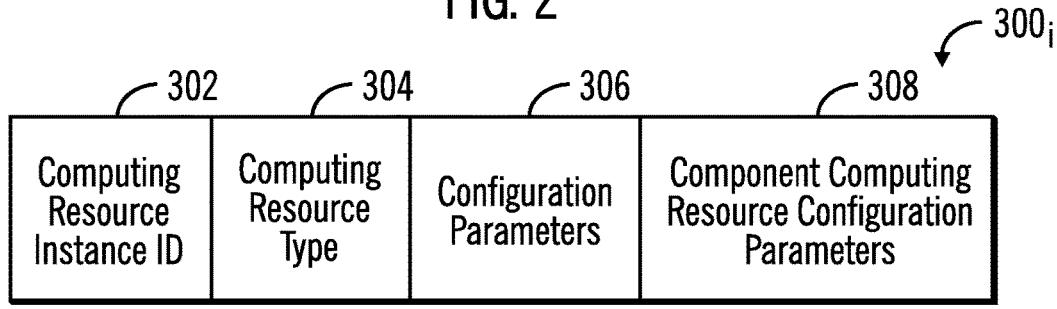
FIG. 3 illustrates an embodiment of a computing resource instance.

FIG. 3 illustrates an embodiment of a computing resource instance $300_i$ comprising an actual configured instance of a computing resource type $200_i$, which may be configured through the configuration pages 107 generated by the resource configuration program 106, including a computing resource instance identifier 302 identifying the specific computing resource; a computing resource type 304; configuration parameters 306 comprising computing resource 302 specific parameters; and user entered component computing resource configuration parameters 308 for the component computing resources. Parameters may not be provided for all the component computing resources if resources are not allocated from that particular component computing resource type.

Figure 4:
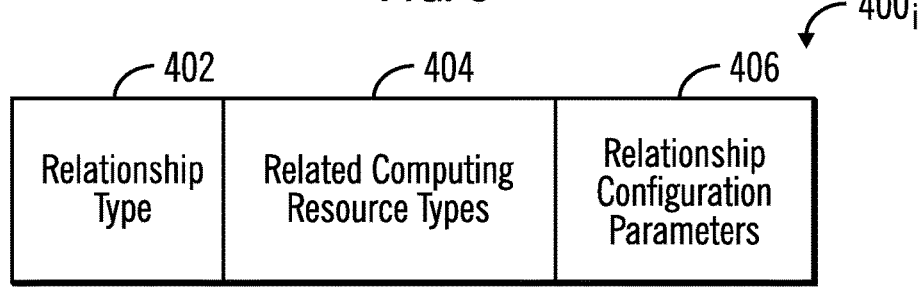
FIG. 4 illustrates an embodiment of a use relationship type.

FIG. 4 illustrates an embodiment of an instance of a user relationship type $400_i$ indicating the relationship type 402, e.g., mirroring, mapping, etc.; related computing resource types 404 of the computing resource types $200_i$ involved in the relationship, such as a source and target volumes subject to a mirror relationship, a volume mapped to host systems, etc.; and relationship configuration parameters 406 used to configure the relationship type 402.

Figure 5:
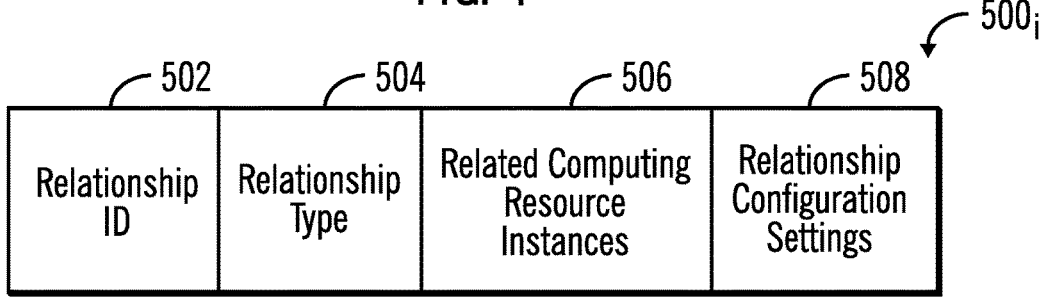
FIG. 5 illustrates an embodiment of a use relationship instance.

FIG. 5 illustrates an embodiment of a use relationship instance $500_i$ comprising an actual configured instance of a use relationship type $400_i$, which may be configured through the configuration pages 107 generated by the resource configuration program 106, including a relationship identifier 502 identifying the particular instance; a relationship type 504 of the relationship $500_i$; two or more related computing resource instances 506 of configured computing resource instances $300_i$ involved in the relationship, e.g., mirroring, mapping, etc.; and relationship configuration settings 508 used to configure the relationship operations for the subject computing resources 506. The related computing resource instances 506 may be configured through the computing resource instance $300_i$ settings.

FIGS. 6 through 10 illustrate examples of how the configuration pages 107 generated by the resource configuration program 106 and rendered in the configuration GUI 108 enable a user to configure a computing resource instances $300_i$ and use relationship instances $500_i$.

Figure 6:
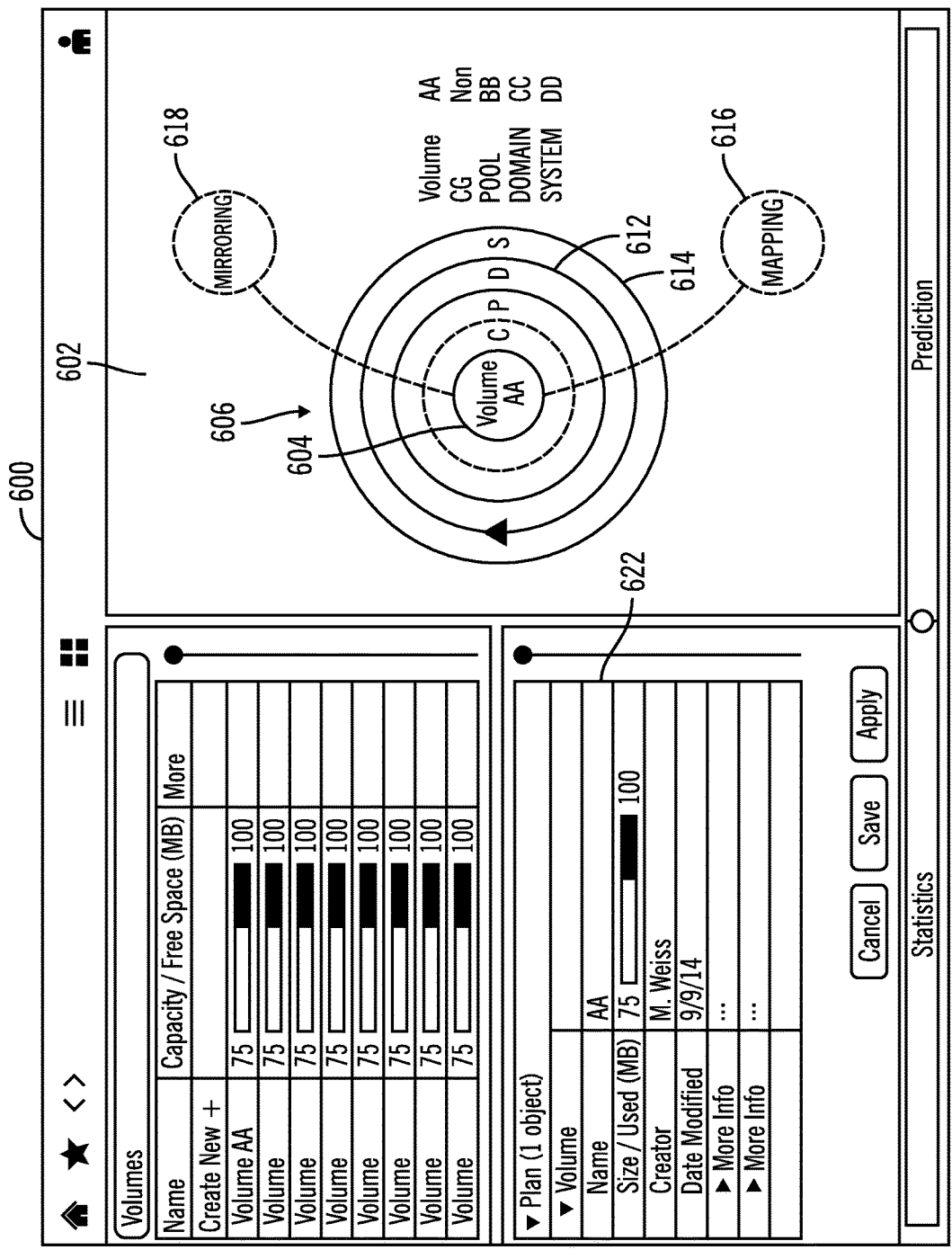
FIGS. 6-10 illustrate examples of configuration pages rendered in a configuration graphical user interface (GUI) to configure computational resources and use relationships.

FIG. 6 shows a configuration page 600, such as one of the configuration pages 107, displaying a panel 602 showing a subject computing resource of a Volume AA to configure, represented as the graphical representation of the innermost concentric circle 604, where the concentric circles 606 comprise the graphical representations of the hierarchy of the component computing resources represented as concentric circles 608, 610, 612, and 614. Each component computing resource represented by a concentric circle contained within another concentric circle is supplied resources from the containing component computing resource. For instance concentric circles 608 represents a consistency group resource in which the volume AA 604 is configured; concentric circle 610 represents a pool from which storage for the subject volume AA is allocated; concentric circle 612 represents a computing domain containing the storage pool and the volume AA, and concentric circle 614 comprise the system containing the domain, pool, consistency group and volume AA being configured.

Concentric circles 610, 612, and 614 are rendered with a design, such as a solid line, indicating configuration settings have been entered for that component computing resource. Concentric circle 608 represents the consistency group component computing resource that has not yet been configured, as shown by the design of a broken line. Different designs other than solid and broken lines may be used to indicate whether a component computing resource has been configured or not configured. Further, not all possible component computing resource types 204 for the subject computing resource type 202 need to be configured, some may be optional and others required, such as the storage pool for a storage volume being a required resource, whereas a volume may not need to be part of a consistency group.

The graphical representations 616 and 618 represent use relationships of mappings and mirroring, respectively. The design of the graphical representations for the use relationships 616 and 618 are shown in a design of a broken line indicating those use relationships are not yet configured. Also, a list is rendered 620 of the component computing resource names, indicating the component computing resources configured, and the consistency group ("CG") indicated as not yet configured, with the "Non" descriptor. The configuration page 600 further shows a panel 622 in which the user may enter configuration settings specific to the volume, such as the size of the volume.

Figure 7:
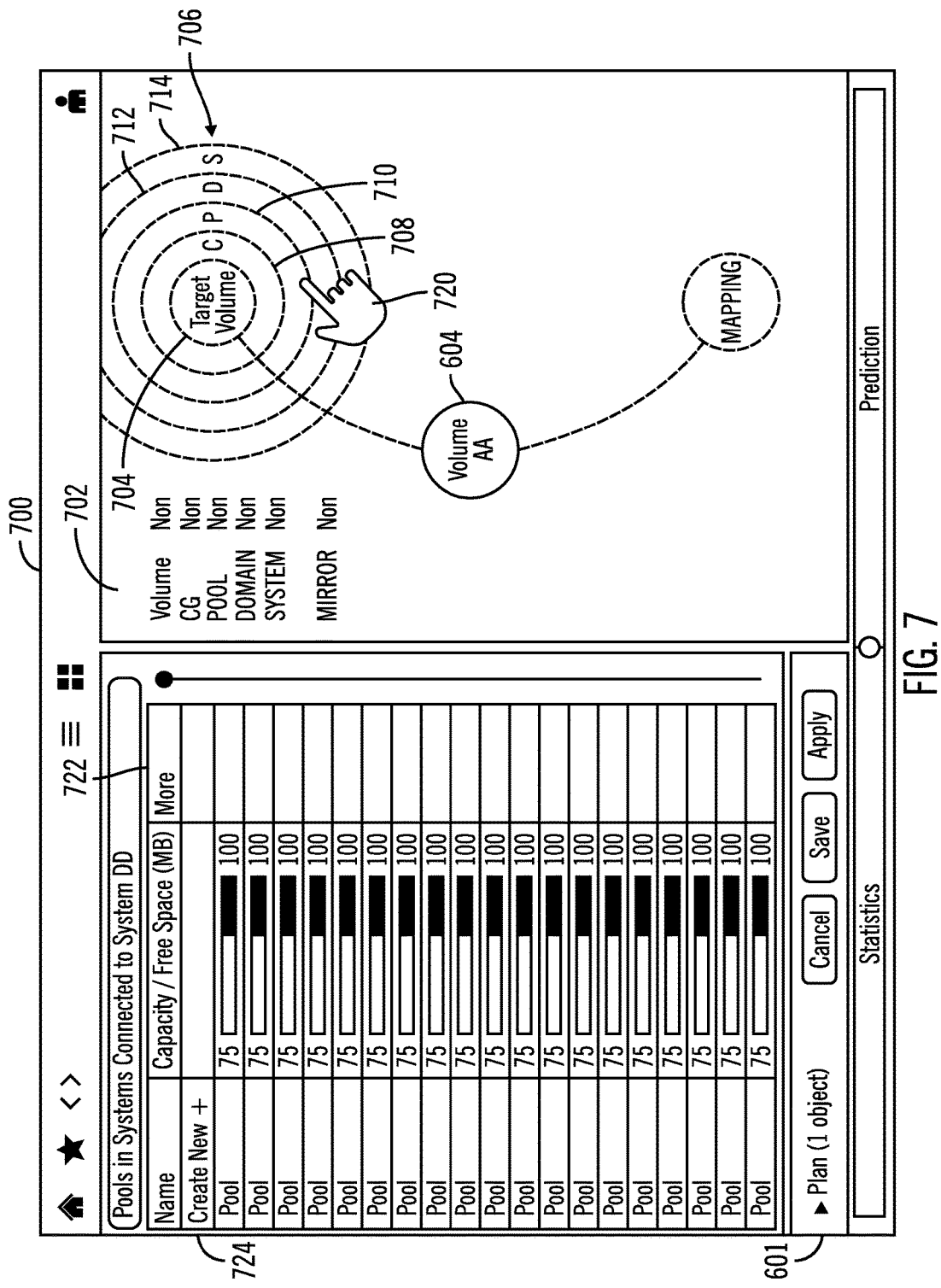

FIG. 7 illustrates a configuration page 700, such as one of the configuration pages 107, displaying a panel 702 that is rendered in response to the user selecting the graphical representation of the mirroring relationship 618 to configure a target volume 704 to which data from Volume AA will be mirrored. FIG. 7 renders graphical representations of the hierarchy of component resources 706, where the component resources, discussed above with respect to FIG. 6, are rendered as concentric circles 708, 710, 712, 714, for the consistency group, storage pool, domain, and system, respectively, in which the related target volume 704 of the mirror copy relationship is configured. In FIG. 7, the concentric circles are all shown in a design indicating they are not yet configured, in broken lines.

FIG. 7 shows a graphical user pointer 720 selecting the pool concentric circle 710 and in response panel 722 displays instances of a user selectable list of storage pool components that the user may select to use as the storage pool from which the target volume 704 is configured. A create new 724 graphical control is rendered to allow the user to add a new component storage pool instance that may be selected for the volume being configured, which could be a target volume configured for a mirror relationship or when selecting a pool for the subject volume AA being considered.

Figure 8:
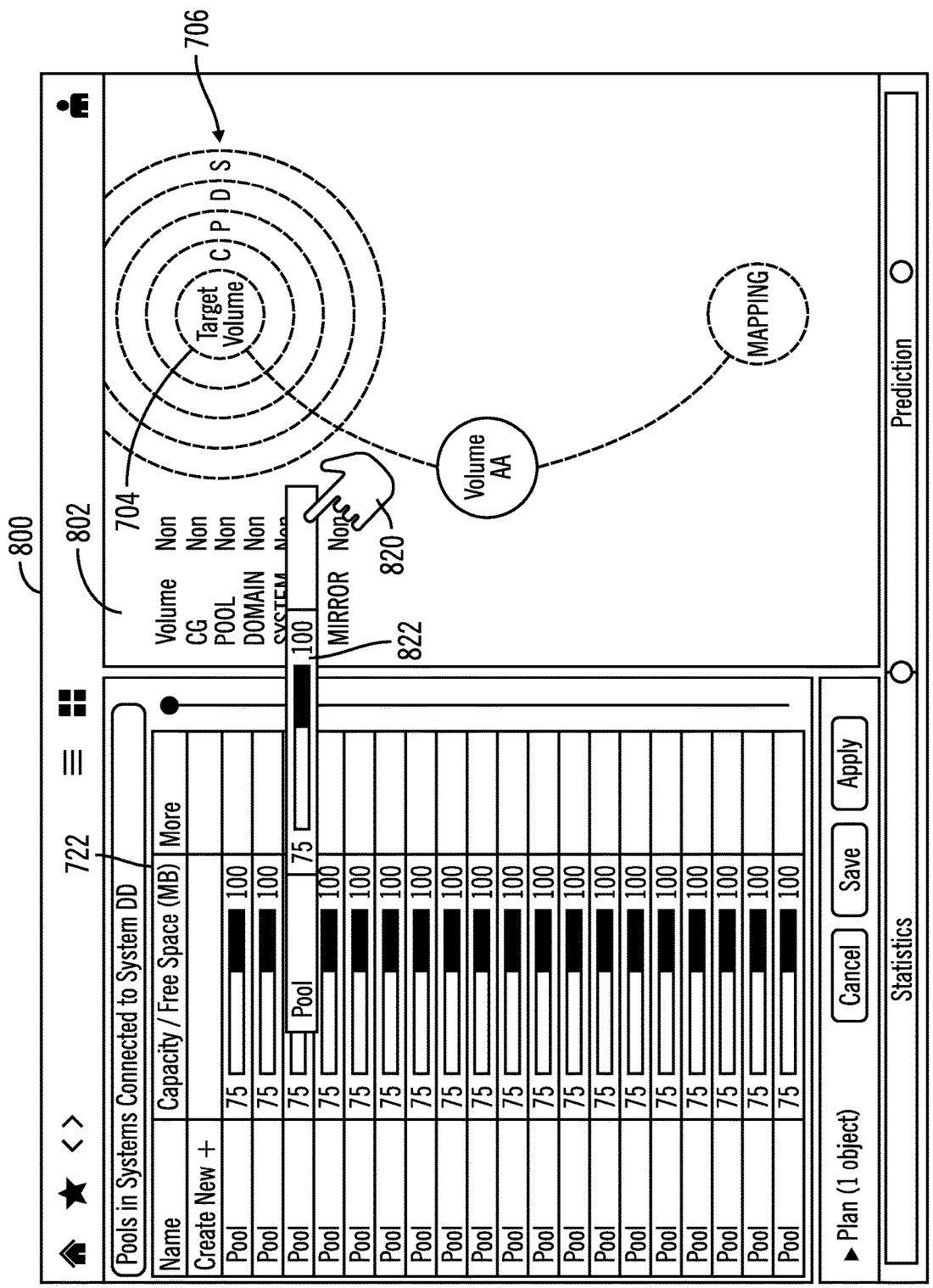

FIG. 8 illustrates a configuration page 800, such as one of the configuration pages 107, rendering the panel 802 comprising panel 702 from FIG. 7 showing the graphical user pointer 820 selecting a component storage pool computing resource 822, referred to as "Pool HH" from the panel 722 shown in FIG. 7 form which storage resources will be configured for the target volume 704.

Figure 9:
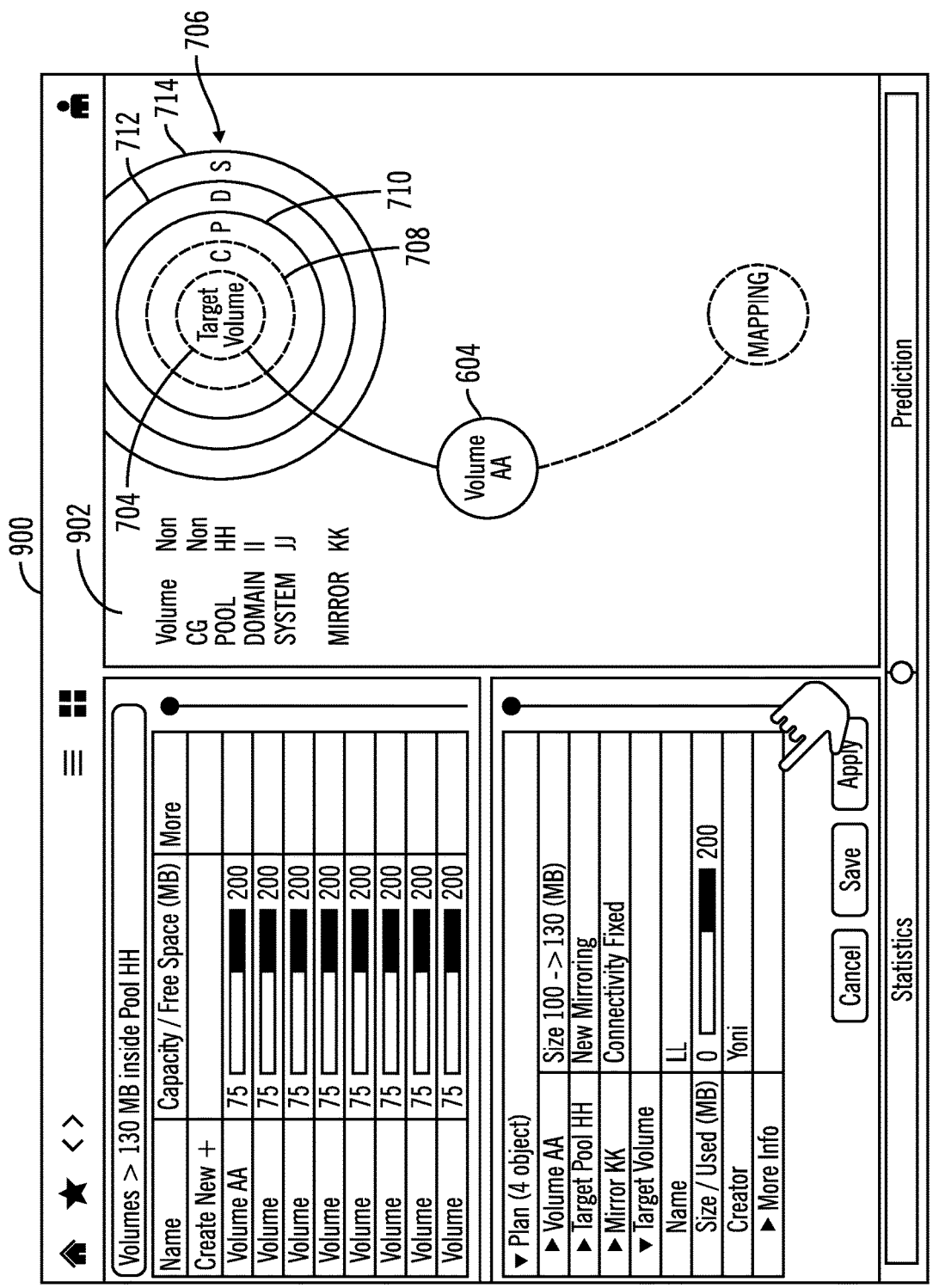

FIG. 9 illustrates a configuration page 900, such as one of the configuration pages 107, resulting from selecting the Pool HH for the target volume of the mirror relationship, which shows the Pool HH as selected as represented by the solid lines for the pool concentric circle 710. Further, since the selected storage pool HH is configured from a domain, and a domain is configured from a system, the domain 712 and system 714 concentric circles are rendered as configured, e.g., solid lines, whereas the elements not configured are rendered to indicate not yet configured, such as broken lines. The user may select the apply button to have all the selected configurations applied for the volume. Not all component configuration resources need to be configured, only those required or essential for the related computing resource being configured.

The above described selection process for component computing resource instances for the target volume in FIGS. 7, 8, and 9 may also be applied when configuring the volume AA 604 computing resource.

Figure 10:
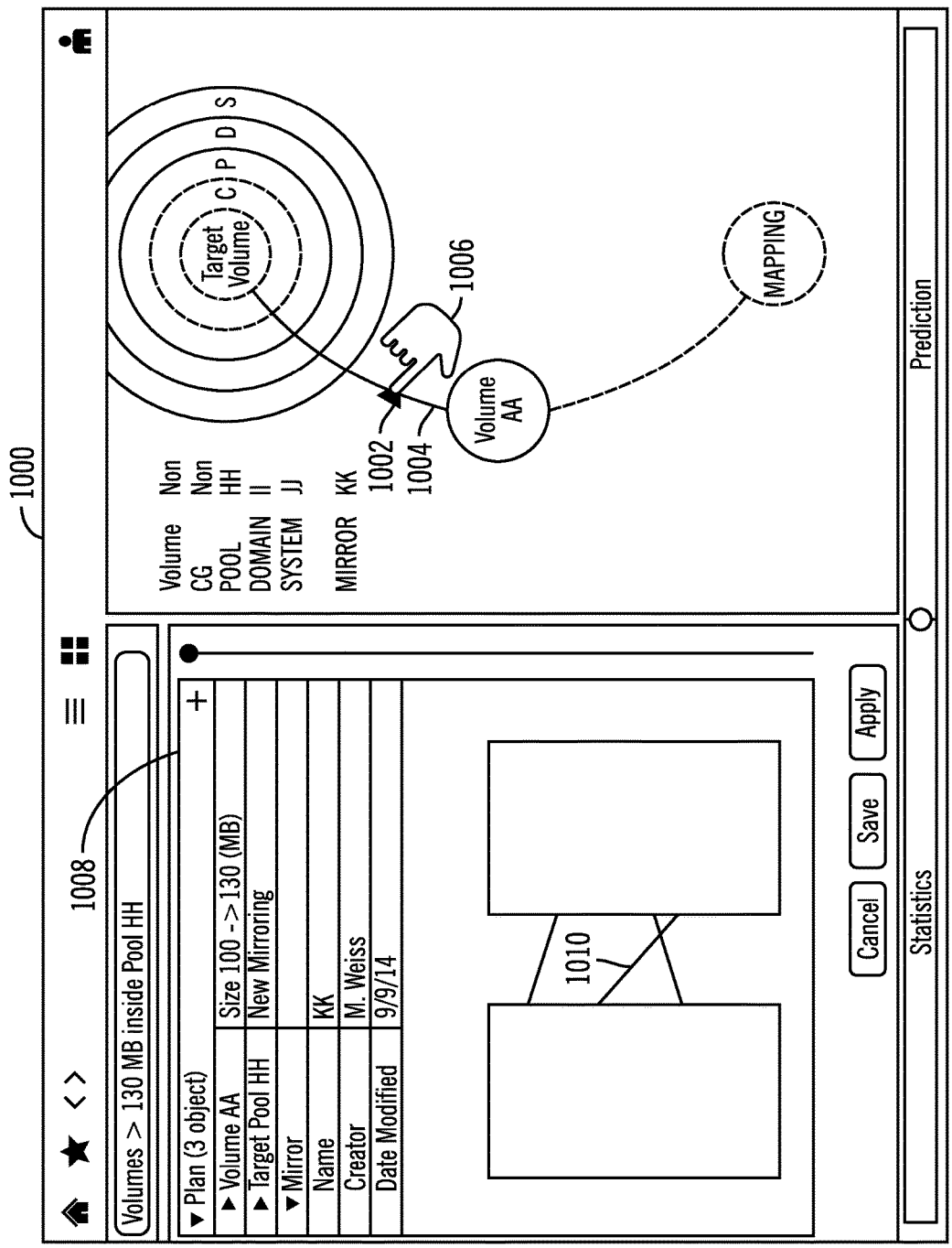

FIG. 10 illustrates an embodiment of a configuration page 1000, such as one of the configuration pages 107, displaying an error icon 1002 rendered on the graphical representation of the mirror relationship 1004, indicating an error in the mirror copy relationship represented by the line graphical representation 1004. User selection of the error icon 1002 which is selected by the user graphical pointer 1006 results in the display of a mirror error panel 1008, which shows that there is a problem in the connection between the volumes in the mirror relationship 1010. The user may then have to take additional actions to correct the error in the connection between the volumes in the mirror relationship.

Figure 11:
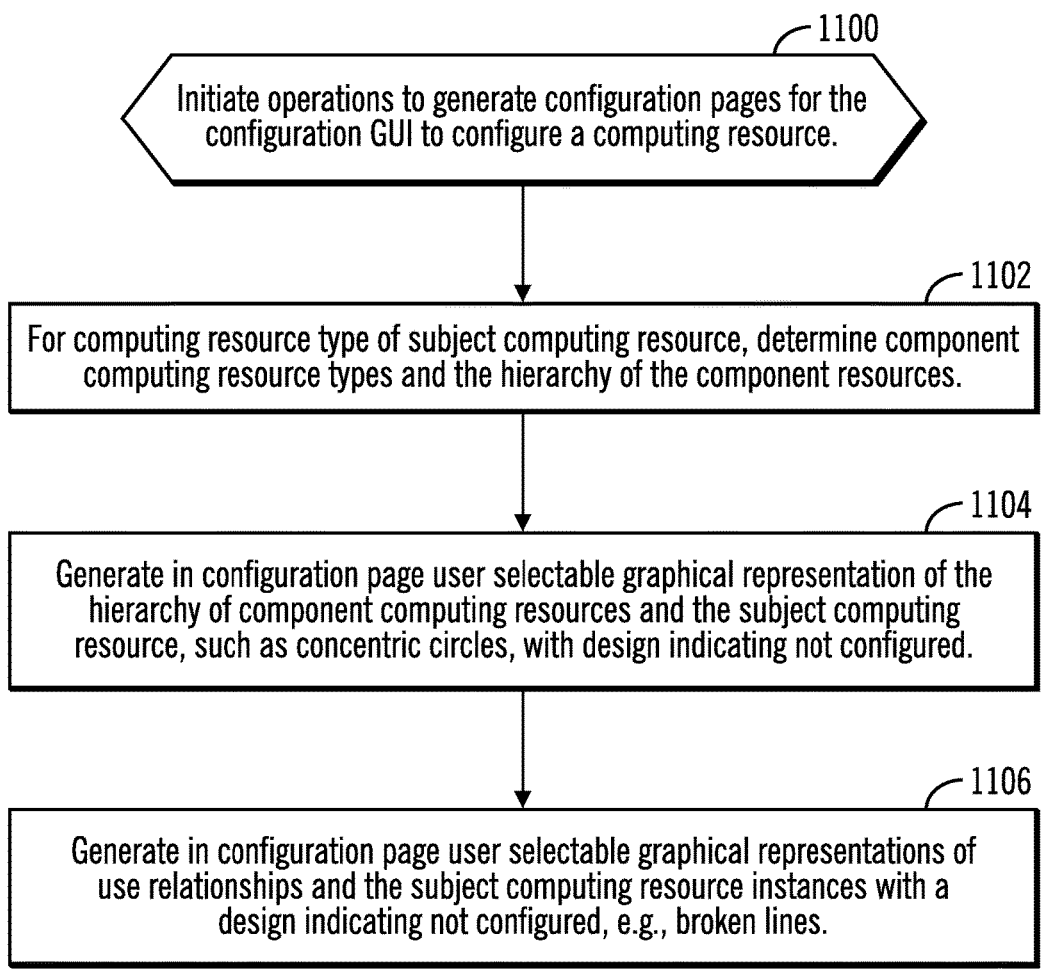
FIG. 11 illustrates an embodiment of operations to generate one or more configuration pages to configure a computing resource.
Figure 12:
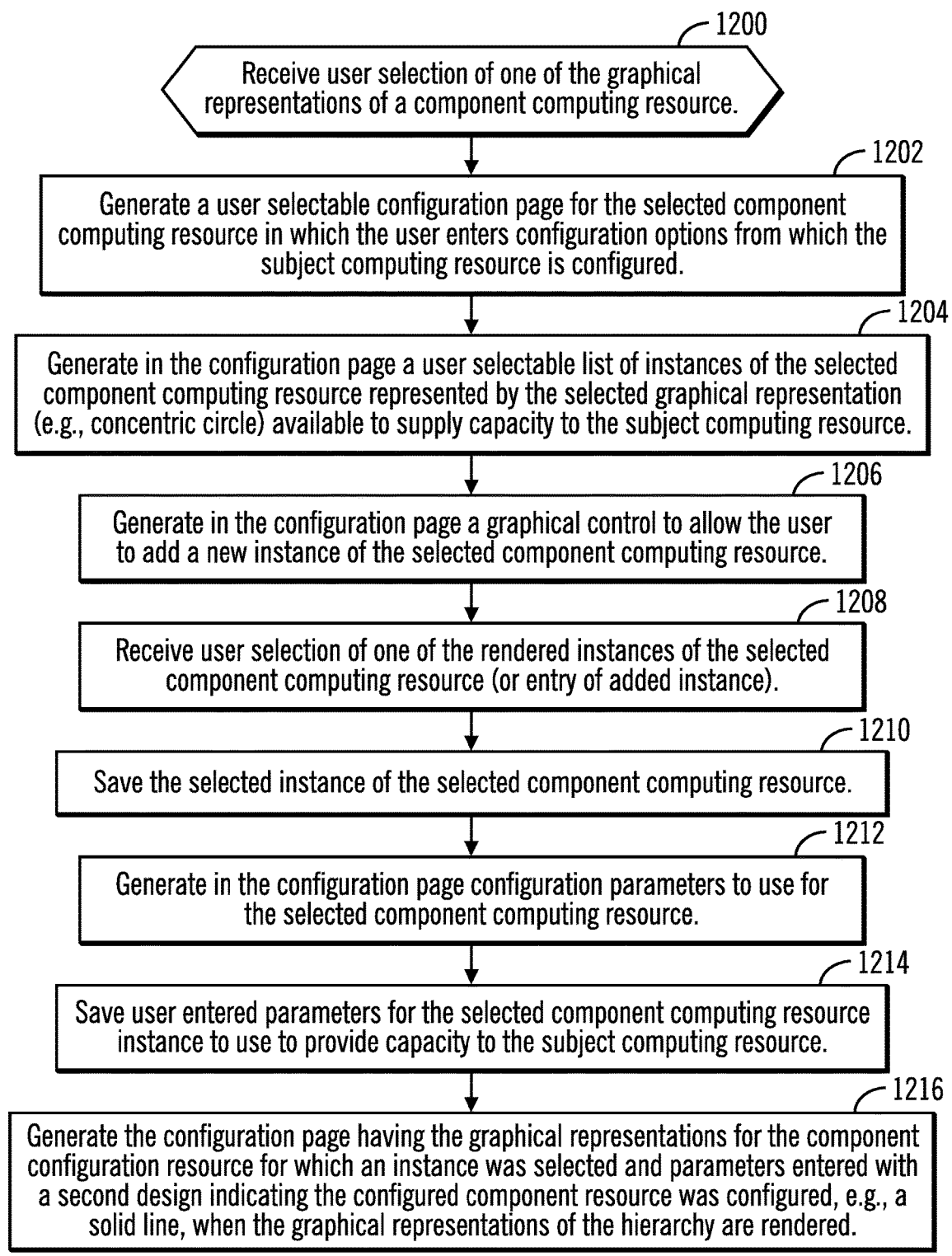
FIG. 12 illustrates an embodiment of operations to process user interaction with the configuration pages to configure a computing resource.
Figure 13:
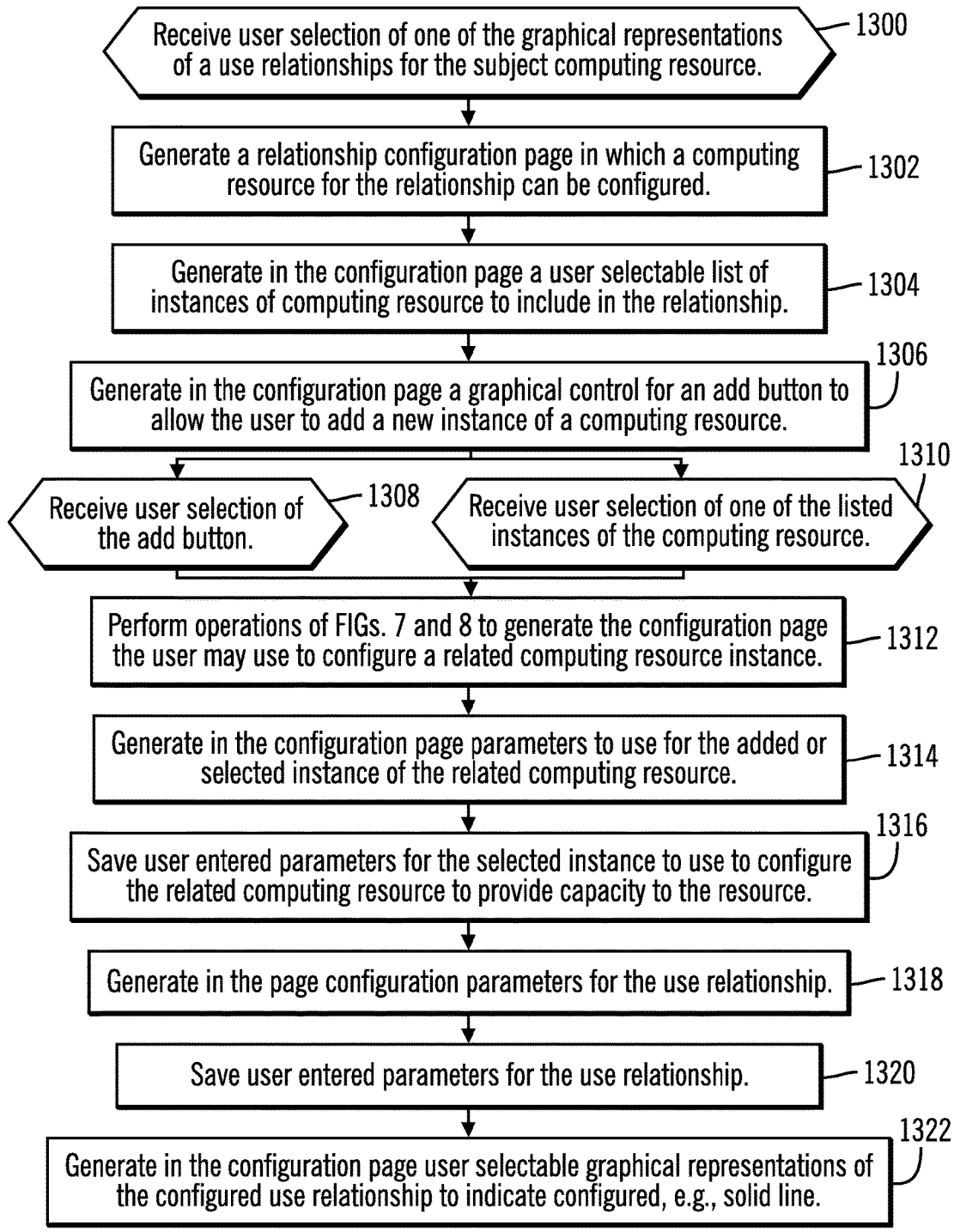
FIG. 13 illustrates an embodiment of operations to process user interaction with the configuration pages to configure a use relationship.

FIGS. 11, 12, and 13 provide embodiments of operations performed by the resource configuration program 106 when executed by the processor 102 to generate the configuration pages 107 to render in the configuration GUI 108, 108a to enable the user at systems 100 and 109 to configure the subject and component computing resources. In generating the page, the resource configuration program 106 may generate a new page 107 or update graphics and panels rendered in the current page 107 to generate the page information.

FIG. 11 illustrates an embodiment of operations performed by the resource configuration program 106 to generate the one or more configuration pages 107 having graphical representations of the hierarchy of component computing resources 206 of the computing resource types 204 for the subject computing resource type 202 to configure and the graphical representations of the use relationships 400 for the subject computing resource to configure. Upon initiating (at block 1100) the operations to generate the initial configuration page 107, the resource configuration program determines (at block 1102) for the computing resource type $200_i$ of the subject computing resource $300_i$ to configure, component computing resource types 204 and the hierarchy of the component computing resources 206. The generated page 109 includes (at block 1104) user selectable graphical representations of the hierarchy of component computing resources 206 and the subject computing resource $300_i$, such as concentric circles, with the design of the graphic representations indicating not configured, such as with broken lines. The generated page 107 further includes (at block 1106) user selectable graphical representations of use relationships 400$_i$ and the subject computing resource instances in the relationship with a design indicating not configured, e.g., broken lines. FIG. 6 illustrates in panel 602 an example of the generated graphical representations 606, 616, 618 generated according to FIG. 11, except that the concentric circles 610, 612, and 614 would be generated with broken lines to indicate they are not configured component resources.

FIG. 12 illustrates an embodiment of operations performed by the resource configuration program 106 to process the configuration page 107 upon receiving user selection of configurations to enter for a selected one of the graphical representations of a component computing resource and regenerate the configuration page 107 (by creating a new page or updating graphics in an existing page). Upon receiving (at block 1200) user selection of one of the graphical representations of a component computing resource 204, such as the concentric circles 608, 610, 612, and 614 shown in FIG. 6, the resource configuration program 106 generates (at block 1202) a configuration page 107 for the selected component computing resource in which the user enters configuration options for that component from which the subject computing resource is configured. The resource configuration program 106 may further generate (at block 1204) in the configuration page 107 a user selectable list of instances of the selected component computing resource 300$_i$ represented by the selected graphical representation (e.g., concentric circle). For example, FIG. 7 shows a user selectable list 722 of pool computing resource instances that the user may select to configure the component pool computing resource represented by the selected concentric circle 710 for the target volume. Although FIG. 7 is shown with respect to configuring the target volume (i.e., related computing resource) for a use relationship, the same principle applies when configuring the subject computing resource or Volume AA. The configuration program 106 may further generate (at block 1206) in the configuration page 107 (either a new page or in the existing page) an add resource graphical control (e.g., "Create New" button 724 in FIG. 7) to allow the user to add a new instance of the selected component computing resource.

The resource configuration program 106 may receive (at block 1208) user selection of one of the rendered instances of the selected component computing resource (or entry of an added instance). The selected instance of the selected component computing resource is then saved (at block 1210) for the subject computing resource 300$_i$ being configured, such as for a storage pool instance for a subject volume being configured or for the target volume of a mirror copy relation being configured.

The configuration program 106 may then generate (at block 1212) the configuration page 107 (either a new page or in the existing page) rendering parameters to use for the selected component computing resource. Any user entered parameters for the selected component computing resource instance are saved (at block 1214) to provide capacity to the subject computing resource. The resource configuration program 106 may then generate (at block 1216) in the page 109 the graphical representation for the component configuration resource for which the instance was selected and parameters entered with a second design indicating the computing component resource was configured, e.g., a solid line, when the graphical representations of the hierarchy are rendered. FIG. 6 shows the second design indicating computing component resources in a hierarchy are configured 6 with concentric circles 610, 612, and 614 of the hierarchy 606 showing that the component computing resources of the system, domain and pool are configured with solid lines.

FIG. 13 illustrates an embodiment of operations performed by the resource configuration program 106 to receive user selection of one of the graphical representations of a use relationship 500$_i$ for the subject computing resource being configured. Upon receiving (at block 1300) user selection of one of the graphical representations of a user relationship 500$_i$, the resource configuration program 106 generates (at block 1302) a relationship configuration page 107 in which a computing resource for the relationship with the subject computing resource can be configured. The resource configuration program 106 generates (at block 1304) in the configuration page 107 a user selectable list of instances of computing resource to include in the relationship that are of the related computing resource type 404 (FIG. 4) for the selected use relationship type 402. A graphical control for an add button (e.g., button 724 in FIG. 7) may also be generated (at block 1306) in the configuration page 107 to allow the user to add a new instance of a related computing resource to include in the relationship 500$_i$ being configured Upon user selection (at block 1308) of the button to add a related computing resource instance 506 or user selection (at block 1310) of one of the listed instances of computing resources, the resource configuration program 106 performs (at block 1312) the operations of FIGS. 7 and 8 to generate the configuration page 107 the user may use to configure a related computing resource instance 506. Configuration parameters may be generated (at block 1314) in the configuration page 107 to use for the added or selected instance of the related computing resource 506 being configured. Any user entered parameters for the related computing resource 300$_i$ are saved (at block 1316), e, g, configuration parameters 308, to use to configure the related computing resource to provide capacity to the related computing resource.

The resource configuration program 106 may further generate (at block 1318) in the page 109 configuration parameters for the use relationship for the user to enter. Any user entered parameters are saved (at block 1320) in the use relationship configuration settings 508 of the user relationship instance 500$_i$ being configured. The configuration program 106 may generate (at block 1322) in the configuration page 107 user selectable graphical representations of the configured use relationship 500$_i$ to indicate configured, e.g., solid line. FIGS. 7, 8, and 9 illustrate examples of the configuration pages 107 for configuring the use relationship by configuring a related Target Volume computing resource for the user relationship with the subject Volume AA. Component computing resources of the related computing resource may be configured, such as the system, domain, pool, and consistency group as shown in FIGS. 7-9.

After entering the configuration parameters for the subject computing resources 110, 112, and any required of the component computing resources, the user may select an apply control to apply the entered settings to configure the subject computing resource based on the settings entered for the component computing resources, use relationships, and specific settings for the subject computing resource. The subject computing resource may be configured even if all the component computing resources are not configured, only essential component computing resources need to be configured, such as a storage pool for a volume. However, non-essential component computing resource and use relationships may not need to be configured to configure the subject computing resource.

Described embodiments provide techniques to allow the user to select the order in which components and relationships of a subject computing resource are configured, by providing a view of all the component computing resources and use relationships, and enabling the user to select an order in which component computing resources and relationships are processed and configured for the subject computing resource.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

Figure 14:
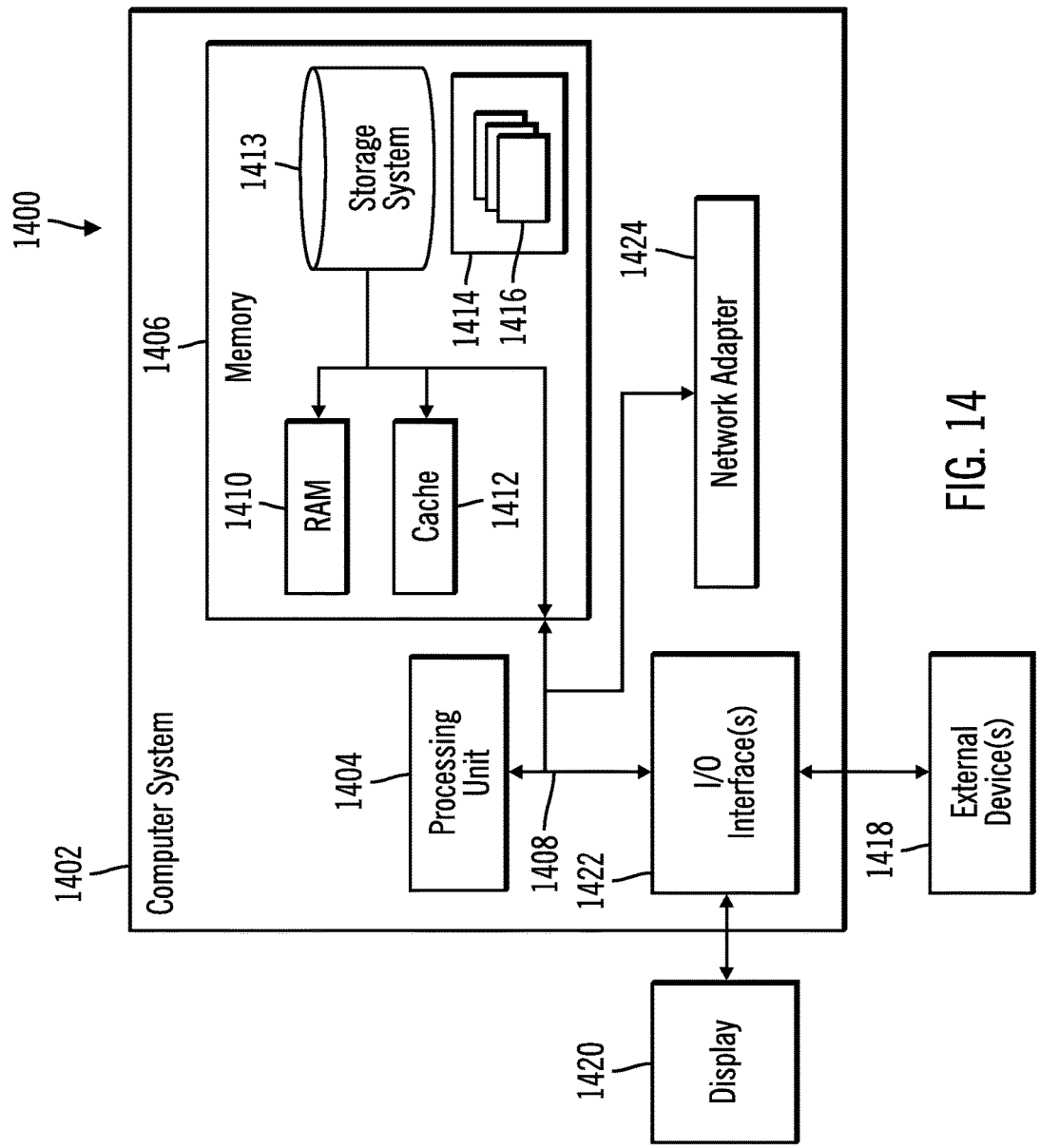
FIG. 14 illustrates a computing environment in which the components of FIG. 1 may be implemented.

The configuration system 100, clients 109, and systems 112 of FIG. 1 may be implemented in one or more computer systems, such as the computer system 1402 shown in FIG. 14. Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 1402 is shown in the form of a general-purpose computing device. The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the invention as described herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components may be used in conjunction with computer system/server 1402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating a configuration page for rendering in a graphical user interface (GUI) for a user to use to configure a computing resource, the computer program product comprising a computer readable storage medium having computer readable program code embodied therein that executes to perform operations, the operations comprising:
   generating a configuration page for rendering in the GUI;
   generating, within the configuration page, a plurality of user selectable concentric shapes representing a hierarchy of component computing resources from which a subject computing resource is configured, wherein only one component computing resource is graphically represented at each level of concentric shapes as one concentric shape representing the component computing resource, wherein each lower level component computing resource is graphically represented by a lower level shape as graphically enclosed within a concentric higher level shape representing a higher level component computing resource in the hierarchy, wherein the lower level component computing resource is configured with capacity from the higher level component computing resource, and wherein the hierarchy comprises at least three levels;
   receiving user selection of one of the user selectable concentric shapes representing a selected one of the component computing resources in graphical representations of the hierarchy; and
   generating, in the configuration page, user selectable component computing resource instances for the selected component computing resource in which the user selects the component computing resource instance from which the subject computing resource is configured, wherein the lower level component computing resource is supplied user selectable computing resources selected from configured of the higher level component computing resource.

2. The computer program product of claim 1, wherein a separate graphical representation is generated for each component computing resource in the graphical representations of the hierarchy, wherein the graphical representation for each of the component computing resources is generated with a first design if the component computing resource represented by the graphical representation has not been configured and generated with a second design if the component computing represented by the graphical representation has been configured.

3. The computer program product of claim 1, wherein the generating the graphical representations of the hierarchy comprises generating concentric circles, wherein an innermost concentric circle of the concentric circles represents the subject computing resource being configured and each of the concentric circles containing the innermost concentric circle represents one of the component computing resources to configure, wherein one concentric circle containing contained concentric circles is at a higher level of the hierarchy than the component computing resources represented by the contained concentric circles.

4. The computer program product of claim 3, wherein the operations further comprise:
   receiving user selection of one of the concentric circles other than the innermost concentric circle;
   generating, in the configuration page, component computing resource instances for the component computing resource represented by the selected concentric circle that are available to supply capacity to the subject computing resource being configured;
   receiving user selection of one of the component computing resource instances; and
   saving the user selected component computing resource instance to use to configure the subject computing resource.

5. The computer program product of claim 4, wherein the generating the configuration page comprises generating a user selectable list of the component computing resource instances represented by the selected concentric circle available for use with the subject computing resource, wherein the operations further comprise:
   receiving user selection of one of the component computing resource instances in the user selectable list; and
   saving the selected component computing resource instance to use when configuring the subject computing resource, wherein the subject computing resource is supplied capacity from the selected instance of the component computing resources.

6. The computer program product of claim 4, wherein the operations further comprise:
   generating, in the configuration page, parameters to use for the selected component computing resource instance; and
   receiving user selection of the parameters to use to further configure the selected component computing resource instance, wherein the subject computing resource is configured from the selected component computing resource instance configured with the user selected parameters.

7. The computer program product of claim 1, wherein the operations further comprise:
   generating, in the configuration page, a user selectable graphical representation of at least one use relationships of the subject computing resource, wherein the use relationship provides information on a relationship of the subject computing resource with a related computing resource; and
   generating, in the configuration page, controls to enable configuration settings to be entered to configure the related computing resource for the for the use relationship.

8. The computer program product of claim 7, wherein the configuration page renders simultaneously the graphical representations of the hierarchy of component computing resources and the graphical representations of the use relationships including the subject computing resource.

9. The computer program product of claim 8, wherein the graphical representations of the hierarchy comprise a rendering of concentric circles, wherein an innermost of the concentric circles represents the subject computing resource being configured and each of the concentric circles containing the innermost concentric circle represents one of the component computing resources to configure, wherein one concentric circle containing contained concentric circles supplies computing resources for contained concentric circles are at a higher level of the hierarchy than the component computing resources represented by the contained concentric circles, and wherein the graphical representations of the use relationships are displayed as lines extending from the concentric circles.

10. A computer program product for generating a configuration page for rendering in a graphical user interface (GUI) for a user to use to configure a subject storage volume, the computer program product comprising a computer readable storage medium having computer readable program code embodied therein that executes to perform operations, the operations comprising:

generating a configuration page for rendering in the GUI;

generating within the configuration page a plurality of user selectable concentric shapes representing a hierarchy of higher level to lower level components comprising, in order from higher level to lower level in the hierarchy, a system, a domain, and a storage pool from which the subject storage volume is configured, wherein the domain is configured from the system, and the storage pool is configured from the domain, and wherein the subject storage volume is configured from instances selected through the configuration page for the system, the domain, and the storage pool, wherein only one component is graphically represented at each level of concentric shapes as one concentric shape representing the component, wherein the lower level components are represented by a lower level shape graphically enclosed within a concentric higher level shape representing a higher level component computing resource in the hierarchy, and wherein the hierarchy comprises at least three levels;

receiving user selection of one of the user selectable concentric shapes representing a selected one of the system, domain, and the storage pool in the graphical representations of the hierarchy; and generating, in the configuration page, user selectable instances for the selected system, domain, or storage pool from which the user selects an instance of the system, domain, or the storage pool, respectively, from which the subject storage volume is configured, wherein the lower level component is supplied user selectable computing resources selected from configured of the higher level component computing resource.

11. The computer program product of claim 10, wherein the operations further comprise:

generating in the configuration page a user selectable graphical representation of a mirror copy relationship of the subject storage volume and a target storage volume to which data from the subject storage volume is mirrored; and rendering in the configuration page in response to user selection of the graphical representation of the mirror copy relationship a graphical representation of the target storage volume and a user selectable graphical representations of a hierarchy of the system, domain, and storage pool from which the target storage volume is configured.

12. The computer program product of claim 11, wherein the operations further comprise:

generating in the configuration page a user selectable graphical representation of a mapping of the subject storage volume; and generating in the configuration page, in response to user selection of the graphical representation of the mapping, a graphical representation of at least one host system to which the target storage volume maps.

13. A system for generating a configuration page for rendering in a graphical user interface (GUI) for a user to use to configure a computing resource, comprising:

a processor; and a computer readable storage medium having program code that in response to execution by the processor performs operations, the operations comprising generating a configuration page for rendering in the GUI;

generating within the configuration page a plurality of user selectable concentric shapes representing a hierarchy of component computing resources from which a subject computing resource is configured, wherein only one component computing resource is graphically represented at each level of concentric shapes as one concentric shape representing the component computing resource, wherein each lower level component computing resource is graphically represented by a lower level shape as graphically enclosed within a concentric higher level shape representing a higher level component computing resource in the hierarchy, wherein the lower level component computing resource is configured with capacity from the higher level component computing resource, and wherein the hierarchy comprises at least three levels;

receiving user selection of one of the user selectable concentric shapes representing a selected one of the component computing resources in graphical representations of the hierarchy; and generating, in the configuration page, user selectable component computing resource instances for the selected component computing resource in which the user selects the component computing resource instance from which the subject computing resource is configured, wherein the lower level component computing resource is supplied user selectable computing resources selected from configured of the higher level component computing resource.

14. The system of claim 13, wherein a separate graphical representation is generated for each component computing resource in the graphical representations of the hierarchy, wherein the graphical representation for each of the component computing resources is generated with a first design if the component computing resource represented by the graphical representation has not been configured and generated with a second design if the component computing resource represented by the graphical representation has been configured.

15. The system of claim 13, wherein the generating the graphical representations of the hierarchy comprises generating concentric circles, wherein an innermost concentric circle of the concentric circles represents the subject computing resource being configured and each of the concentric circles containing the innermost concentric circle represents one of the component computing resources to configure, wherein one concentric circle containing contained concentric circles is at a higher level of the hierarchy than the component computing resources represented by the contained concentric circles.

16. The system of claim 15, wherein the operations further comprise:

receiving user selection of one of the concentric circles other than the innermost concentric circle;

generating, in the configuration page, component computing resource instances for the component computing resource represented by the selected concentric circle that are available to supply capacity to the subject computing resource being configured;
receiving user selection of one of the component computing resource instances; and
saving the user selected component computing resource instance to use to configure the subject computing resource.

17. A system for generating a configuration page for rendering in a graphical user interface (GUI) for a user to use to configure a subject storage volume, comprising:
a processor; and
a computer readable storage medium having program code that in response to execution by the processor performs operations, the operations comprising
generating a configuration page for rendering in the GUI;
generating within the configuration page a plurality of user selectable concentric shapes representing a hierarchy of higher level to lower level components comprising, in order from higher level to lower level in the hierarchy, a system, a domain, and a storage pool from which the subject storage volume is configured, wherein the domain is configured from the system, and the storage pool is configured from the domain, and wherein the subject storage volume is configured from instances selected through the configuration page for the system, the domain, and the storage pool, wherein only one component is graphically represented at each level of concentric shapes as one concentric shape representing the component, wherein the lower level components are represented by a lower level shape graphically enclosed within a concentric higher level shape representing a higher level component computing resource in the hierarchy, and wherein the hierarchy comprises at least three levels;
receiving user selection of one of the user selectable concentric shapes representing a selected one of the system, domain, and the storage pool in graphical representations of the hierarchy; and
generating, in the configuration page, user selectable instances for the selected system, domain, or storage pool from which the user selects an instance of the system, domain, or the storage pool, respectively, from which the subject storage volume is configured, wherein the lower level component is supplied user selectable computing resources selected from configured of the higher level component computing resource.

18. The system of claim 17, wherein the operations further comprise:
generating in the configuration page a user selectable graphical representation of a mirror copy relationship of the subject storage volume and a target storage volume to which data from the subject storage volume is mirrored; and
rendering in the configuration page in response to user selection of the graphical representation for the mirror copy relationship a graphical representation of the target storage volume and a user selectable graphical representations of a hierarchy of the system, domain, and storage pool from which the target storage volume is configured.

19. The system of claim 18, wherein the operations further comprise:
generating, in the configuration page, a user selectable graphical representation of a mapping of the subject storage volume; and
generating in the configuration page, in response to user selection of the graphical representation of the mapping, a graphical representation of at least one host system to which the target storage volume maps.

20. A method for generating a configuration page for rendering in a graphical user interface (GUI) for a user to use to configure a computing resource, comprising:
generating a configuration page for rendering in the GUI;
generating within the configuration page a plurality of user selectable concentric shapes representing a hierarchy of component computing resources from which a subject computing resource is configured, wherein only one component computing resource is graphically represented at each level of concentric shapes as one concentric shape representing the component computing resource, wherein each lower level component computing resource is graphically represented by a lower level shape as graphically enclosed within a concentric higher level shape representing a higher level component computing resource in the hierarchy, wherein the lower level component computing resource is configured with capacity from the higher level component computing resource, and wherein the hierarchy comprises at least three levels;
receiving user selection of one of the user selectable concentric shapes representing of a selected one of the component computing resources in graphical representations of the hierarchy; and
generating, in the configuration page, user selectable component computing resource instances for the selected component computing resource in which the user selects the component computing resource instance from which the subject computing resource is configured, wherein the lower level component computing resource is supplied user selectable computing resources selected from configured of the higher level component computing resource.

21. The method of claim 20, wherein a separate graphical representation is generated for each component computing resource in the graphical representations of the hierarchy, wherein the graphical representation for each of the component computing resources is generated with a first design if the component computing resource represented by the graphical representation has not been configured and generated with a second design if the component computing represented by the graphical representation has been configured.

22. The method of claim 20, wherein the generating the graphical representations of the hierarchy comprises generating concentric circles, wherein an innermost concentric circle of the concentric circles represents the subject computing resource being configured and each of the concentric circles containing the innermost concentric circle represents one of the component computing resources to configure, wherein one concentric circle containing contained concentric circles is at a higher level of the hierarchy than the component computing resources represented by the contained concentric circles.

23. The method of claim 22, further comprising:
receiving user selection of one of the concentric circles other than the innermost concentric circle;
generating, in the configuration page, component computing resource instances for the component computing resource represented by the selected concentric circle that are available to supply capacity to the subject computing resource being configured;
receiving user selection of one of the component computing resource instances; and
saving the user selected component computing resource instance to use to configure the subject computing resource.

24. The method of claim 20, further comprising:
generating, in the configuration page, a user selectable graphical representation of at least one use relationships of the subject computing resource, wherein the use relationship provides information on a relationship of the subject computing resource with a related computing resource; and
generating, in the configuration page, controls to enable configuration settings to be entered to configure the related computing resource for the for the use relationship.

25. The method of claim 24, wherein the configuration page renders simultaneously the graphical representations of the hierarchy of component computing resources and the graphical representations of the use relationships including the subject computing resource.

\* \* \* \* \*